United States Patent [19]

Winfree

[11] Patent Number: 4,564,356

[45] Date of Patent: Jan. 14, 1986

[54] LABORATORY TURRET SHAKER

[75] Inventor: Clarence H. Winfree, Macomb County, Mich.

[73] Assignee: The United States of America as represented by the Secretary of the Army, Washington, D.C.

[21] Appl. No.: 713,069

[22] Filed: Mar. 18, 1985

[51] Int. Cl.[4] .............................................. G09B 9/04
[52] U.S. Cl. .......................................... 434/29; 434/58
[58] Field of Search ...................... 434/11, 29, 58, 62, 434/55

[56] References Cited

U.S. PATENT DOCUMENTS

| Re. 27,051 | 2/1971 | Cappel | 434/58 |
| 3,295,224 | 1/1967 | Cappel | 434/58 |
| 3,304,628 | 2/1967 | Kaplan | 434/58 |
| 3,484,951 | 12/1969 | Menzel | 434/29 X |
| 3,645,011 | 2/1972 | Callanen | 434/58 |
| 3,967,387 | 7/1976 | Marchegiani | 434/58 |
| 3,984,924 | 10/1976 | Myles et al. | 434/29 |
| 4,507,086 | 3/1985 | Borg | 434/29 |

FOREIGN PATENT DOCUMENTS

| 1268522 | 5/1968 | Fed. Rep. of Germany | 434/29 |
| 874071 | 8/1961 | United Kingdom | 434/58 |

Primary Examiner—William H. Grieb
Attorney, Agent, or Firm—Peter A. Taucher; John E. McRae; Robert P. Gibson

[57] ABSTRACT

A mechanical shaker mechanism used in the laboratory for imparting oscillatory motions to a military tank turret. The mechanism can be programmed to duplicate test track conditions at lesser cost then would be required to operate a complete tank on a proving ground. The mechanism is designed to include special link mechanisms between the power devices and the turret-support ring. Other stabilizer link mechanisms are provided between the turret-support ring and stationary anchorage points.

10 Claims, 9 Drawing Figures

LABORATORY TURRET SHAKER

GOVERNMENT INTEREST

The invention described herein may be manufactured, used, and licensed by or for the Government for governmental purposes without payment to me of any royalty.

BACKGROUND AND SUMMARY OF THE INVENTION

This invention relates to a tank turret shaker designed to oscillate a conventional turret in pitch and roll planes. The turret thus is caused to undergo stresses similar to those experienced when a complete tank traverses rough terrain at high or medium speeds and high acceleration/deceleration rates. The shaker may be used to test the structural integrity of equipment (computers, range finders, etc.) mounted in the turret.

Use of a turret shaker is advantageous compared to actual testing of a complete tank on a proving ground in that the shaker can be automatically programmed and left unattended on a round-the-clock basis, thereby accelerating a given test sequence. The shaker can be programmed to achieve a pre-specified test; that test can be precisely repeated in a fashion not possible when a human driver attempts to run a tank over a test track at pre-specified speeds. Comparative test data can be obtained without degradation of a proving ground facility or change in the terrain profile due to degeneration of the terrain.

A principal object of the present invention is to provide a turret shaker that can withstand high stresses associated with rapid oscillation of a turret weighing in the neighborhood of ten tons. Another object is to provide a relatively large size shaker that can be fabricated without close manufacturing tolerances or excessive dimensional control accuracy. A further object is to provide a shaker that is relatively light and has a relatively low moment of inertia.

THE DRAWINGS IN GREATER DETAIL

Figure 1:
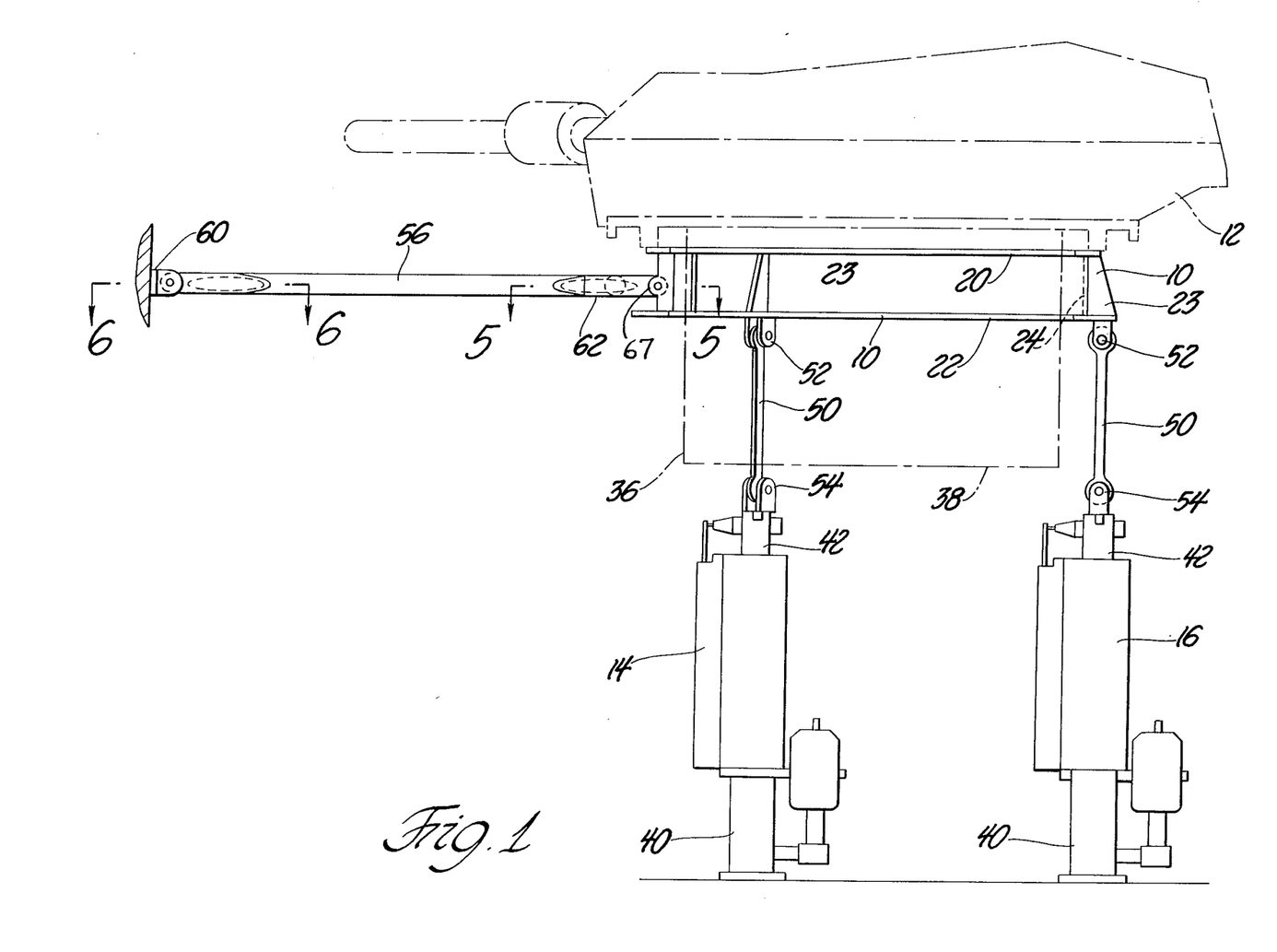
FIG. 1 is a side elevational view of one embodiment of the invention.
Figure 2:
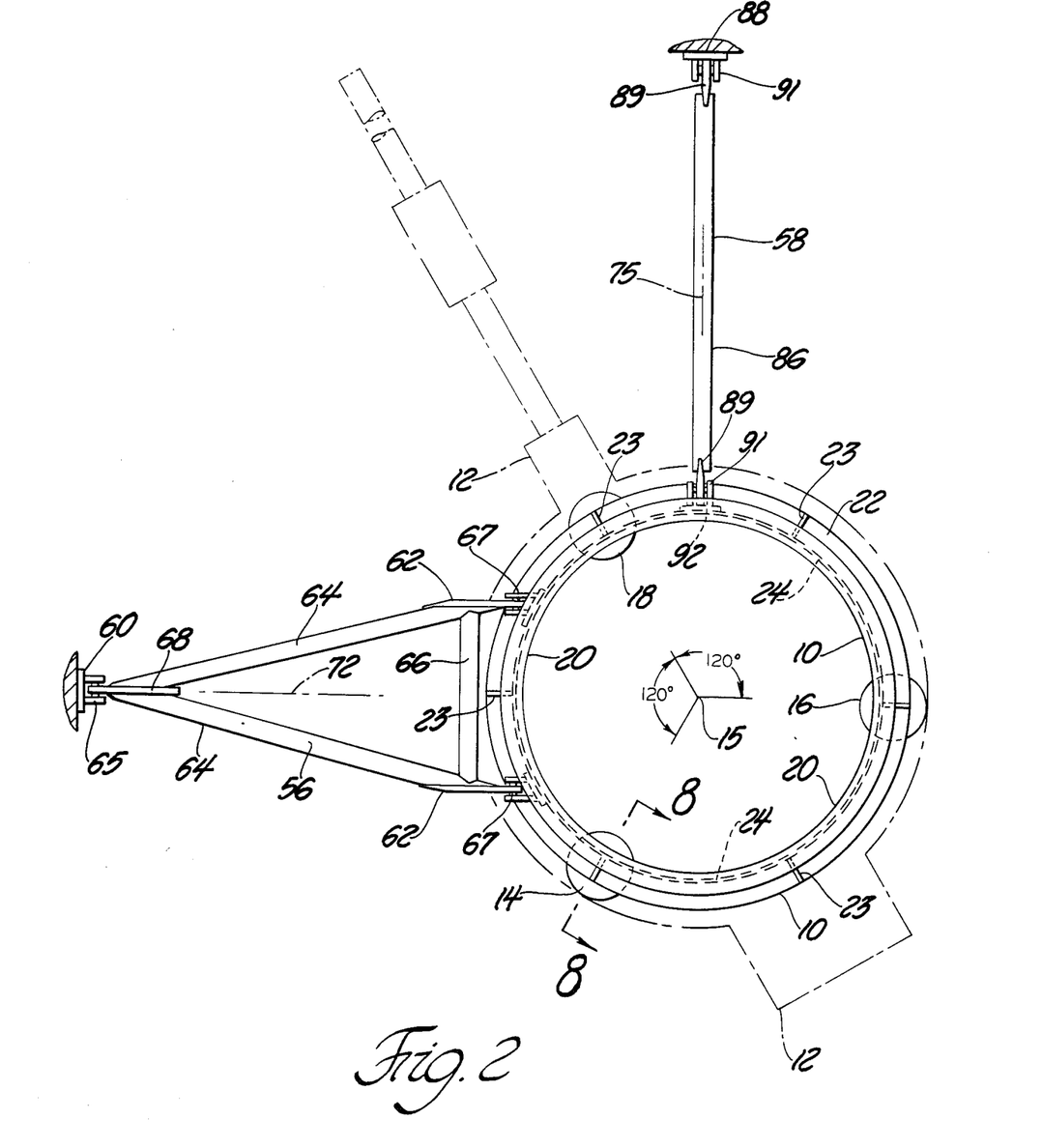
FIG. 2 is a top plan view of the FIG. 1 embodiment.

FIGS. 1 and 2 illustrate a tank turret shaker that comprises an annular platform 10 sized to receive a conventional turret 12. Platform 10 is supported by means of three upright fluid cylinders 14, 16 and 18. Two of the three cylinders are shown in elevation in FIG. 1. All three cylinders are shown in FIG. 2. Vertical reciprocatory motions of the fluid cylinders cause turret 12 to undergo motions similar to those motions that occur when a tank traverses rough terrain.

Figure 8:
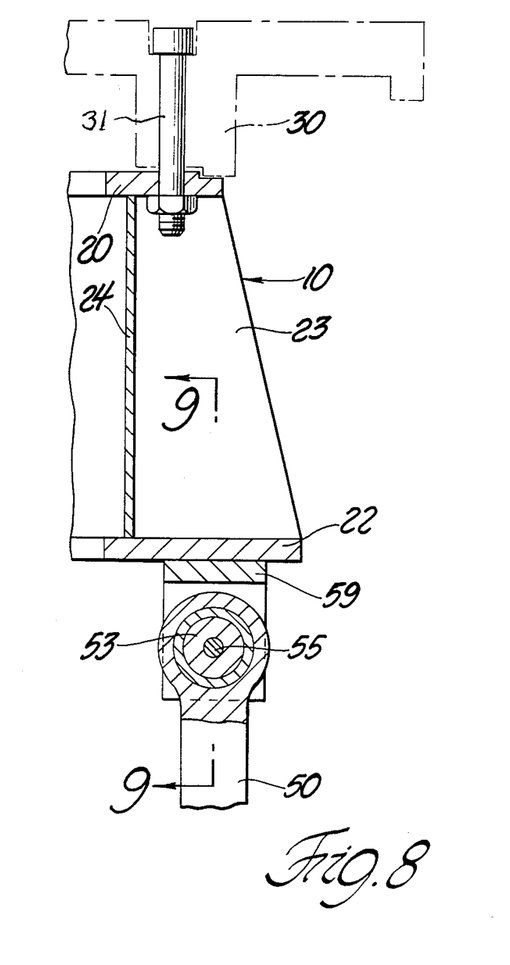
FIG. 8 is an enlarged fragmentary sectional view on line 8—8 in FIG. 2.

As seen in FIGS. 1 and 8, platform 10 includes a flat annular upper plate 20, a flat annular lower plate 22, and a curved connector plate or cylinder 24. As seen in FIG. 2, plate 24 has an arcuate (circular) annular configuration; as seen in FIGS. 1 and 8, plate 24 has a flat cross sectional configuration. Reinforcement plates (gussets) 23 are provided at spaced points around the platform. FIG. 2 shows six reinforcements 23; however, more reinforcements may be used if necessary (depending on the turret weight and gage thickness of plates 20, 22 and 24).

The conventional turret is fragmentarily shown in FIG. 8 to include an annular support ring 30 suitably secured to plate 20 by means of a bolt 31 extending through plate 20. In practice, a number of such bolts would be provided at equally spaced points around platform 10. The turret has a cylindrical basket 36 depending therefrom. When the turret is bolted onto platform 10 basket 36 extends downwardly through the space circumscribed by plates 20 and 22. The basket includes a floor 38.

FLUID CYLINDER ACTUATORS

The three fluid cylinders 14, 16 and 18 may be double acting or single acting. Each fluid cylinder comprises a cylinder structure 40 and piston rod structure 42. Each cylinder is supplied with hydraulic fluid from a pressure source (not shown). Fluid flow into or out of each cylinder is controlled by one or more solenoid valves.

When the solenoid valves are closed, fluid is trapped in the associated cylinder; under such conditions, structure 42 maintains a stationary position. The structure can be held stationary in a raised position, an intermedite position or a lowered position, depending on the quantity of liquid trapped within the cylinder.

Typically, the weight of the platform-turret assembly is in the neighborhood of ten tons. The fluid source pressure is typically about 3,500 p.s.i. The control valves may be controlled by any suitable programming device, such as a motor-driven tape (or disk) having spaced openings or magnetized areas thereon designed to pass over a sensing head (not shown). Electrical pulses are generated to selectively (alternately) energize the various control valves. The tape will have three control tracks thereon, one for each fluid cylinder 14, 16 or 18.

The present invention is not concerned with the control valve mechanism. The present invention is particularly concerned with special link mechanisms designed to support and stabilize platform 10 (and associated turret 12) while pressure fluids are flowed to or from cylinders 14, 16 and 18.

LINK STRUCTURES

A support link 50 is associated with each fluid cylinder 14, 16 or 18. Each support link is connected to the superjacent platform 10 by means of a universal joint 52. Each support link 50 is connected to the subjacent cylinder by means of a universal joint 54. Each universal joint may be a commercial item sized to handle the expected load. A characteristic of such universal joints is that the elongated link can swing in any given direction relative to the attached structure. For example, as seen in FIG. 1, the rightmost link 50 can swing around the geometrical center of joint 52 in the plane of the paper, or in a plane normal to the plane of the paper, or in planes obliquely angled to the plane of the paper.

Figure 9:
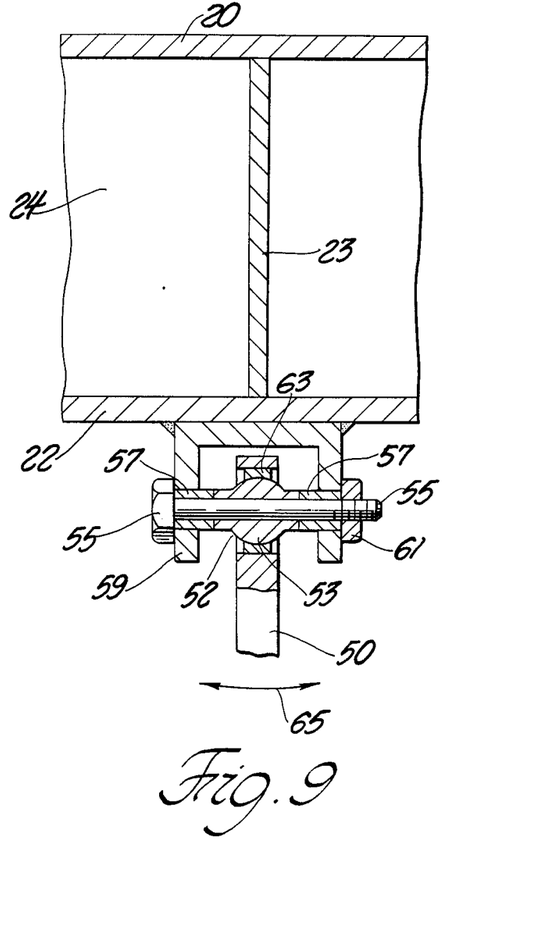
FIG. 9 is a sectional view on line 9—9 in FIG. 8.

FIGS. 8 and 9 illustrate one form that each universal joint 52 or 54 can take. As shown, the joint comprises a spherical element 53 having a transverse hole adapted to receive a bolt 55. Cylindrical bushings (spacers) 57 are located within openings in a yoke 59 in surrounding relation to bolt 55. A nut 61 is tightened onto bolt 55 to thereby clamp spherical element 53 within the yoke.

Link 50 carries a socket element 63 that slidably encircles spherical element 53. The link can swing around the center of spherical element 53; the swinging motion can occur in the plane of the paper (FIG. 9) as designated by numeral 65, and/or normal to the plane of the paper.

The non-illustrated (lower) end of each link 50 will have a universal joint constructed generally as shown in FIG. 9. The yoke portion of the universal joint will be suitably affixed to the associated structure 42 (FIG. 1).

The three support links 50 transmit the weight of platform 10 and turret 12 to the associated fluid cylinders. However, links 50 lack the lateral rigidity necessary to prevent lateral (horizontal) displacement of the platform-turret assembly. To stabilize the platform-turret assembly against undesired horizontal shift, I provide two stabilizer links 56 and 58.

Stabilizer link 56 is shown in FIG. 2 as an A-frame structure arranged with its wide end attached to platform 10 and its narrow end connected to a fixed anchorage structure 60. The A-frame may be formed of bars or tubes. As shown in FIG. 2, the frame is formed to include two flat bars 62, two convergent tubes 64, and a tubular cross piece 66. The convergent ends of tubes 64 are rigidly joined to a plate 68. The various elements 62, 64, 66 and 68 may be formed into a unitary link structure by conventional welding operations. The wide end of the A-frame link structure is connected to platform 10 by means of two universal joints 67. The narrow end of the A-frame structure is connected to anchorage structure by means of a universal joint 65.

Figure 5:
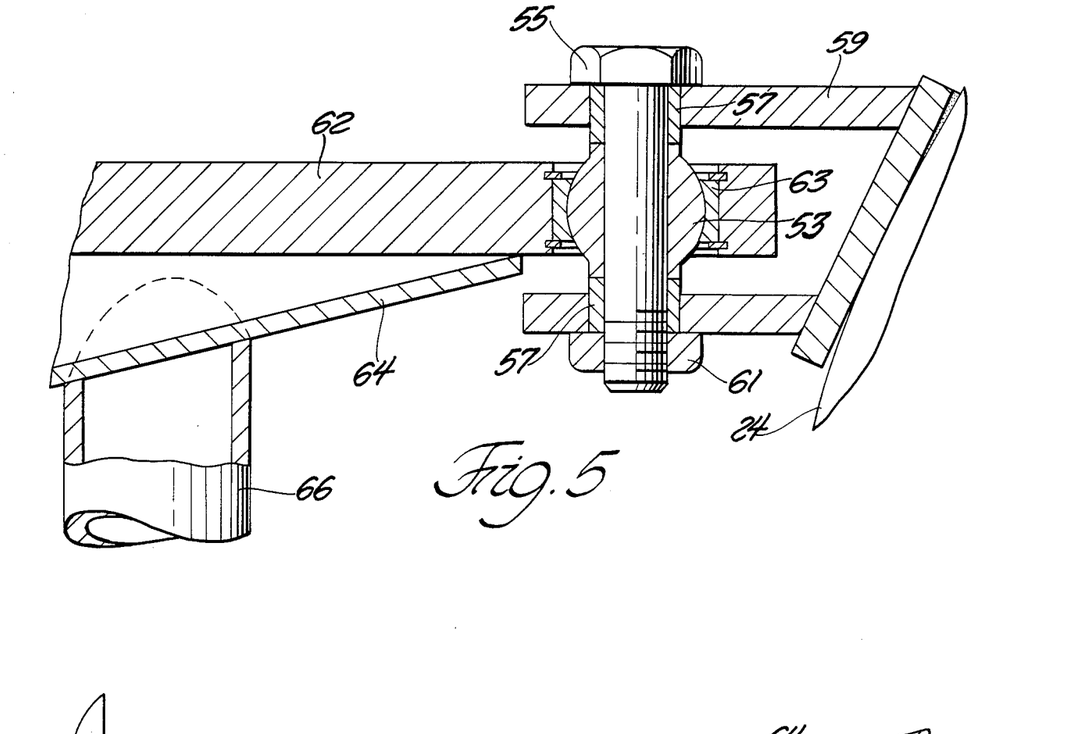
FIG. 5 is an enlarged fragmentary sectional view on line 5—5 in FIG. 1.
Figure 6:
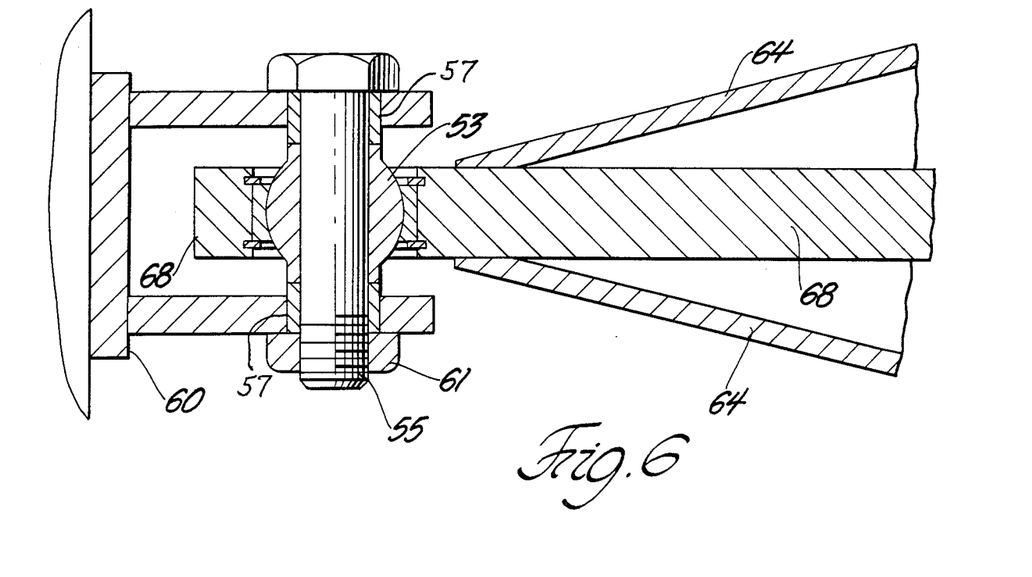
FIG. 6 is an enlarged fragmentary sectional view on line 6—6 in FIG. 1.

FIGS. 5 and 6 illustrate the construction used for universal joints at the wide and narrow ends of the described A-frame structure. Each universal joint is similar to that shown in FIG. 9 (for link 50). Similar reference numerals are employed to designate similar component parts.

Due to imprecision in the manufacturing process, the two plates 62 may not be spaced apart exactly the distance specified by the equipment designer. To compensate for slight dimensional differences, the universal joint for one of the plates 62 is built without bushings 57. For example, if one of the two universal joints is built as shown in FIG. 5, the other universal joint (for the non-illustrated plate 62) is built without bushings 57. The non-illustrated universal joint enables the associated plate 62 to "float", i.e., to take a position somewhat offset from the longitudinal centerline of the associated yoke 59. This is not detrimental to joint performance since the joint is loaded primarily in the direction of plate 62 (i.e., longitudinally).

Figure 7:
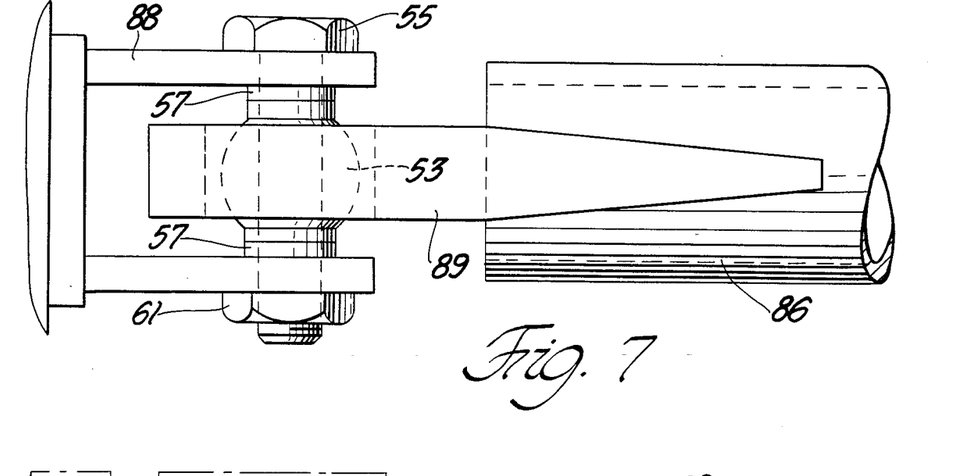
FIG. 7 is an enlarged fragmentary view of a structural detail used in the FIG. 1 embodiment.

Link 58 (shown in FIG. 2) is constructed as an elongated hollow tube 86. Each end of the tube is attached to the associated yoke structure 88 or 92 by means of a universal joint 91. FIG. 7 illustrates the outline configuration of one joint; the other universal joint is similarly configured. Internally each universal joint may be the same as shown in FIG. 5 or FIG. 6. Each universal joint comprises a flat plate 89 suitably welded to the associated end of tube 86.

Referring especially to FIG. 2, anchorage structures 60 and 88 are rigidly attached to stationary portions of the building in which the apparatus is housed. The stationary building portions can be walls of the building, columns, posts, etc. The A-frame link 60 and tubular link 58 are elongated structures, each approximately as long as the diameter of platform 10 (e.g., about eight feet). By making the links relatively long, it is possible to minimize the disturbing effect that link motions have on the position or attitude of platform 10.

CYLINDER ARRANGEMENT AND OPERATIONAL MODE

The various fluid cylinders 14, 16 and 18 cooperate with the associated links 50 to define three separate support structures for platform 10 and turret 12. As seen in FIG. 2, the cylinders are spaced equidistantly around the platform circumference, i.e., the cylinders are spaced one hundred twenty degrees apart, as measured from platform central axis 15.

Still referring to FIG. 2, if the longitudinal axis 72 for A-frame link 56 is continued rightwardly through and beyond platform axis 15, it will be seen that axis 72 intersects the line of action of cylinder 16. Cylinder 16 may be considered to be on axis 72 (although diammetrically opposed to link 56). Axis 72 may be visualized as an imaginary line representing the longitudinal axis of the tank designed to accommodate turret 12. Vertical oscillation of the cylinder 16 mechanism causes the turret to undergo a pitching motion similar to the motion that would occur if the turret were mounted in an actual tank moving over rough terrain. The pitch action can be accomplished by operating only cylinder 16 (cylinders 14 and 18 being held motionless). The pitch action can also be accomplished by operating all three cylinders (e.g., with cylinder 16 moving oppositely to cylinders 14 and 18).

Figure 3:
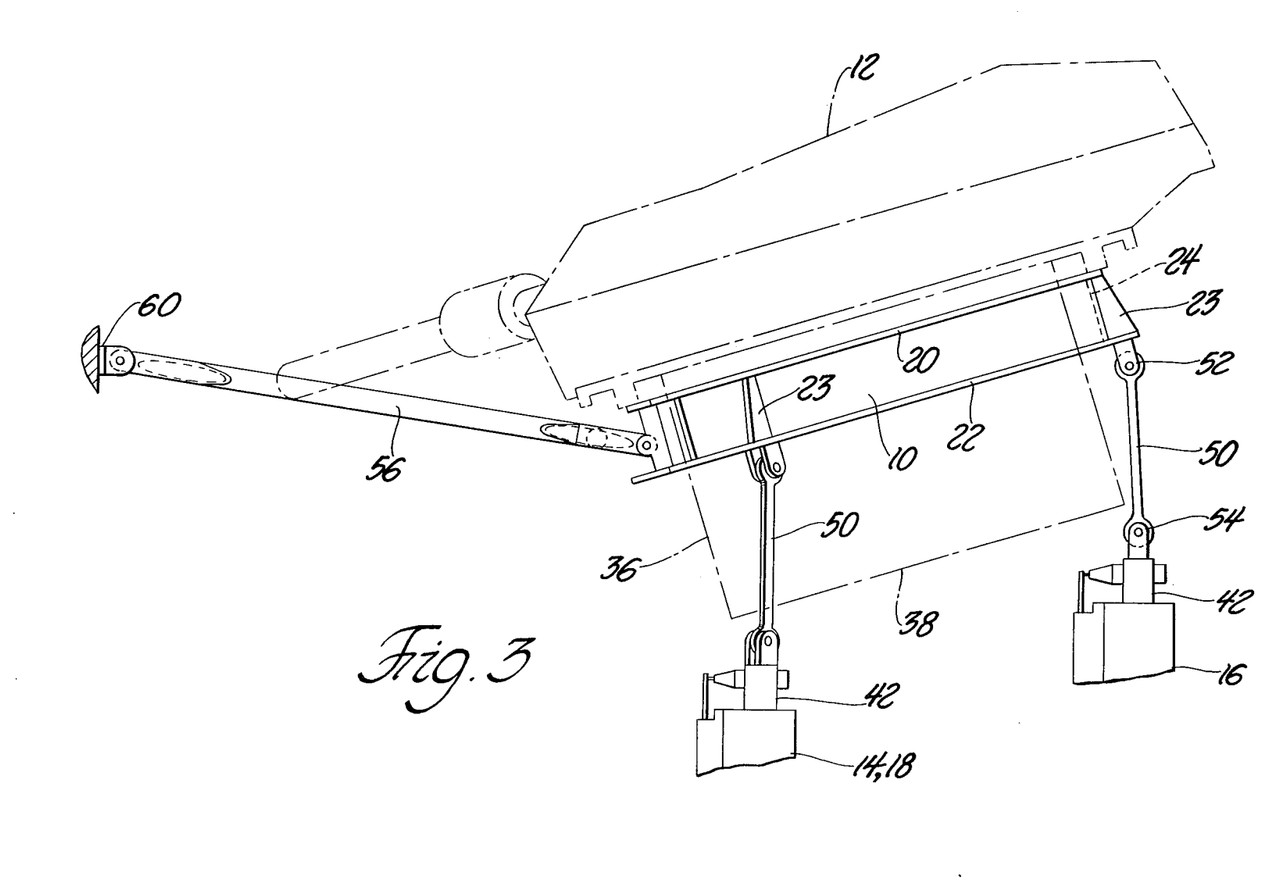
FIGS. 3 and 4 are views taken in the same direction as FIG. 1, but showing the mechanisms in different positional attitudes.
Figure 4:
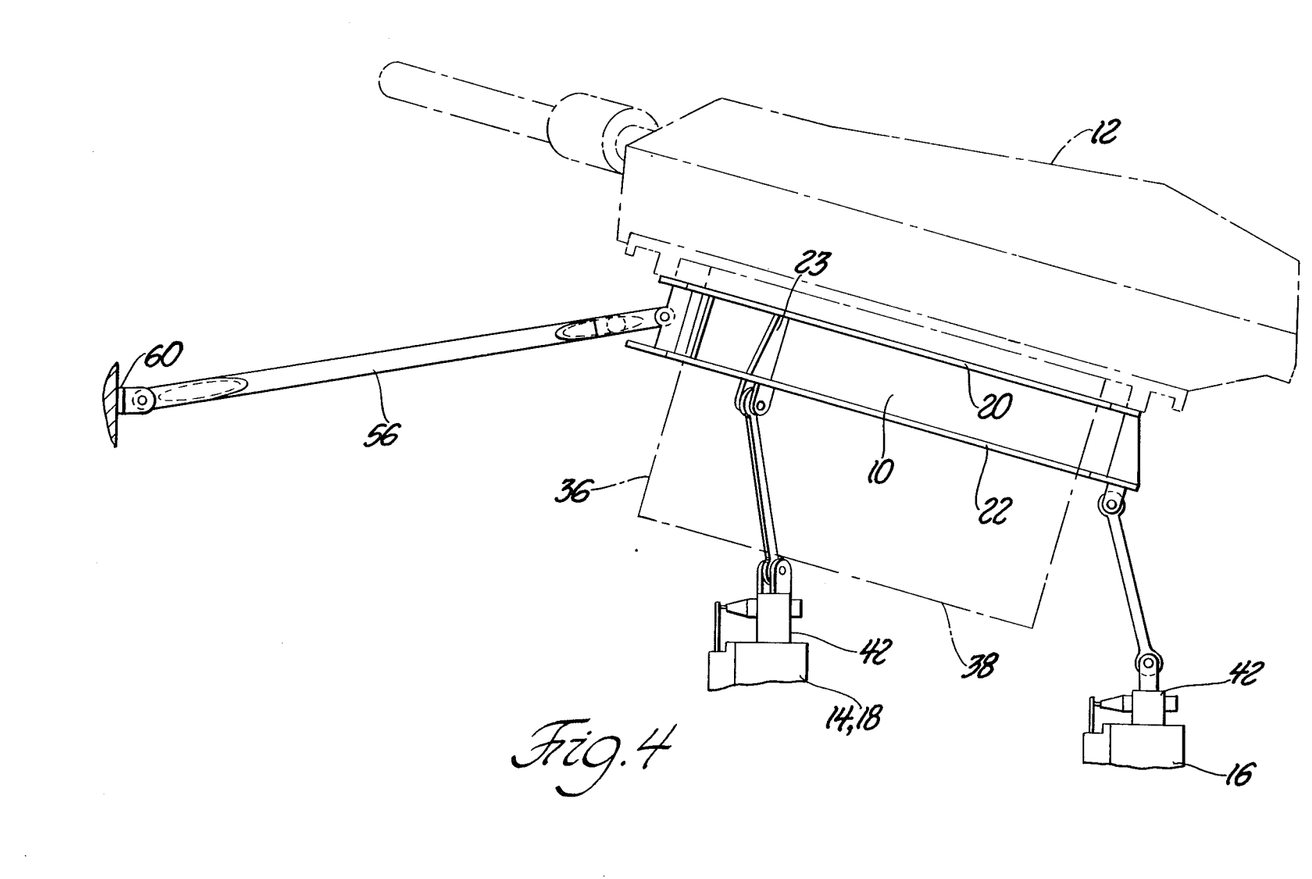

The general operational mode can be visualized from FIGS. 3 and 4. The turret is tilted in opposite directions from its so-called "level attitude" position shown in FIG. 1. By programming the control valves for cylinders 14, 16 and 18, it is possible to oscillate the platform-turret assembly between the FIG. 1 "level attitude" position and the FIG. 3 "tilted" position. Such an oscillatory motion produces "pitch" forces on the turret that approximate forces generated when an actual tank traverses rough terrain.

During the described pitch motion, the stabilizer links 56 and 58 prevent lateral dislocation of the platform-turret assembly. Link 56 has a slight swing motion in a vertical plane. Link 58 undergoes a slight circular (rotational) motion around its longitudinal axis, and a slight lateral swinging motion (in a horizontal plane).

While the turret is in its FIG. 1 "level attitude" position, links 56 and 58 are in a common horizontal plane with platform 10. Anchorages 60 and 88 are located in horizontal planar alignment with platform 10, to thereby determine the normal at-rest link orientation. As seen in FIG. 2, the two stabilizer links 56 and 58 are disposed in right angular relation to one another. The longitudinal axis 72 for link 56 may be visualized as the tank longitudinal axis. The link 58 axis 75 may be visualized as a tank "pitch" axis.

To accomplish a "roll" motion around longitudinal axis 72, the two cylinders 14 and 18 may be simultaneously operated in opposite directions, with cylinder 16 held motionless. During such a roll motion link 56 swivels around axis 72. Link 58 swings in a vertical plane going through the aforementioned pitch axis 75.

If it is desired to achieve simultaneous pitch and roll motions then all three cylinders 14, 16 and 18 may be operated simultaneously (although not in phase with one another).

During the pitching or rolling motions, it is desirable that weight support links 50 remain approximately vertical. Slight tilting motions of the support links, as shown in FIG. 4, are not objectionable. However, if the support links were to swing more than a few degrees from the vertical (e.g., fifteen degrees) the link lines of action would be undesirably oblique to the action lines of piston structures 42. Bending stresses would be imposed on the links. Also, oblique frictional forces would be generated at the piston-cylinder slide surfaces. Since the pistons normally operate at relatively high peak velocities, e.g., more than twenty feet per second, high frictional forces could produce undesirable wear actions.

To minimize excessive lateral swing motions of support links 50, the support links are designed to be relatively long. As seen in FIG. 1, each link 50 has its lower universal joint 54 below the level of basket floor 38 (when the basket is in a level attitude). Each link 50 has its upper universal joint 52 connected directly to platform 10. Each support link 50 is relatively long, e.g., thirty three inches in a typical system.

Excessive lateral swing motions of support links 50 are also prevented by constructing each stabilizer link 56 or 58 as a relatively long structure, such that pivot structures 67 and 91 move substantially vertically, with minimum lateral motion components. In a typical system, each stabilizer link has a length approximately the same as the outside diameter of platform 10. Exact dimensions are not critical.

SIMILARITIES WITH PRIOR ART

U.S. patent application, Ser. No. 611,572, filed in the name of Henry Borg on May 18, 1984 now U.S. Pat. No. 4,507,086, granted Mar. 26, 1985, illustrates an arrangement that utilizes three rigidly-mounted fluid cylinders (or multiple cylinder actuators). In this sense, the Borg arrangement is similar to my presently proposed arrangement. My arrangement differs from the Borg arrangement in the use of support links 50 and stabilizer links 56 and 58.

The use of support links 50 enables the various fluid cylinders 14, 16 and 18 to be located relatively close to the central axis of platform 10 (15 in FIG. 2). By locating the cylinders close to the platform axis, it is possible to achieve a given platform tilt motion with a relatively small piston stroke. Higher effective accelerations are possible with a given piston motion speed.

U.S. Pat. No. 3,295,224 to K. L. Cappel, shows an arrangement wherein six fluid cylinders are used; the cylinders are grouped in pairs (for a total of three cylinder pairs). Each cylinder is angled obliquely to a vertical motion line for the support platform; each fluid cylinder has a universal joint connection with the floor and the supported platform.

The arrangement shown in the Cappel patent is believed to be disadvantageous in that a rather complex control valve system would be required to achieve any given platform motion; a minimum of two cylinders is required to achieve the simplest motion. In Cappel, the cylinders in each pair of cylinders are required to travel different distances; it is believed that some degree of cylinder synchronization would be required to accomplish even the simplest motion (if loadings were to be kept fairly even). My proposed arrangement is believed to be advantageous over the Cappel arrangement in that cylinder loadings can be maintained fairly even; for any specific motion only one cylinder has to be actuated. Cylinder synchronization is not a prerequisite for operability.

In the Cappel arrangement, six control tracks are required, one for each cylinder. In my proposed arrangement, only three control tracks (or tapes) are needed.

Since the Cappel fluid cylinders are obliquely angled to the vertical motion lines of the supported platform, relatively long piston strokes are required to achieve a given vertical motion of the platform. My proposed arrangement can use shorter stroke fluid cylinders than the Cappel arrangement.

In my proposed arrangement, each upright fluid cylinder is directly below a section of platform 10. Support links 50 extend directly upwardly from the fluid cylinders. The platform is constructed to have an I-beam cross-section for maximum resistance to bending, twisting, or other undesired distortion. Reinforcement ribs 23 are provided at points where links 50 deliver impact forces to the platform. The platform is designed for manufacture as a light weight structure having a low moment of inertia.

I wish it to be understood that I do not desire to be limited to the exact details of construction shown and described for obvious modifications will occur to a person skilled in the art, without departing from the spirit and scope of the appended claims.

I claim:

1. A tank turret shaker mechanism comprising an annular platform sized to receive a turret; said platform having an opening therein to accommodate a circular basket depending from the turret; said platform occupying a horizontal plane when the turret has a level attitude; a first anchorage structure spaced laterally from said platform; a second anchorage structure spaced laterally from said platform; said platform and anchorage structures occupying a common horizontal plane when the turret has a level attitude; a first elongated stabilizer link extending from the platform to the first anchorage structure; a second elongated stabilizer link extending from the platform to the second anchorage structure; said stabilizer links being oriented at right angles to each other in a common horizontal plane when the turret has a level attitude; said first stabilizer link being located on an imaginary line representing the longitudinal axis of the tank designed to receive the turret; said second-stabilizer link being located on an imaginary line representing a pitch axis for the tank; three platform support structures spaced equidistantly around the platform; one of said platform support structures being located on the aforementioned longitudinal tank axis; each platform support structure comprising an upright fluid cylinder means located substantially directly below a section of the platform, and a support link extending upwardly from the fluid cylinder to the platform; each support link being oriented vertically when the turret has a level attitude.

2. The tank turret shaker mechanism of claim 1, each support link having a first universal joint connection with the fluid cylinder means and a second universal joint connection with the platform.

3. The tank turret shaker mechanism of claim 2 wherein the turret basket includes a floor occupying a horizontal plane when the turret is in a level attitude; the support links having their second universal joint connections located slightly below the plane of the basket floor when the turret is in a level attitude.

4. The tank turret shaker mechanism of claim 1, said first stabilizer link having an A-frame configuration in the horizontal plan dimension, the wide end of the A-frame being located at the platform, and the narrow end of the A-frame being located at the first anchorage structure.

5. The tank turret shaker mechanism of claim 4, said first stabilizer link having a universal joint configuration with the first anchorage structure, and spaced pivotal connections with the platform.

6. The tank turret shaker mechanism of claim 1, said second stabilizer link having a first universal joint connection with the platform, and a second universal joint connection with said second anchorage structure.

7. The tank turret shaker mechanism of claim 1 wherein said first stabilizer link has a pivotal connection with the platform, and a universal joint connection with said first anchorage structure.

8. The tank turret shaker mechanism of claim 1, said one platform support structure being connected to the platform at a point thereon diammetrically opposed to the platform connection point for the first stabilizer link.

9. The tank turret shaker mechanism of claim 1, each stabilizer link having a length that is approximately the same as the outside diameter of the annular platform.

10. The tank turret shaker mechanism of claim 1, said annular platform comprising a flat upper plate normally occupying a horizontal plane, a flat lower plate normally occupying a horizontal plane, and a connector plate joining the upper and lower plates; said connector plate having an arcuate annular configuration in horizontal plan, and a vertical configuration in radial planes generated from the platform central axis.

* * * * *